United States Patent [19]
Grunau et al.

[11] Patent Number: 5,366,210
[45] Date of Patent: Nov. 22, 1994

[54] SPRING SYSTEM WITH ELASTOMERIC AND TEMPERATURE RESPONSIVE SPRINGS IN PARALLEL

[75] Inventors: Rudi Grunau, Gross-Gerau; Herwig Hönlinger, Gross-Rohrheim; Jürgen Morr, Wald-Michelbach, all of Germany

[73] Assignee: Firma Carl Freudenberg, Weinheim, Germany

[21] Appl. No.: 33,592

[22] Filed: Mar. 18, 1993

[30] Foreign Application Priority Data

Mar. 25, 1992 [DE] Germany .................... 4209610

[51] Int. Cl.$^5$ ............................................. F16F 15/08
[52] U.S. Cl. ............................ 267/140.4; 267/140.2; 188/380; 248/621
[58] Field of Search ......... 267/140.11, 140.15, 267/140.2, 140.4, 152; 188/268, 276, 378–380; 180/300, 312, 902; 248/562, 605, 621, 638

[56] References Cited

FOREIGN PATENT DOCUMENTS

| 0192941 | 8/1986 | Japan | 188/268 |
| 0209638 | 8/1990 | Japan | 188/380 |
| 2256932 | 10/1990 | Japan | 267/140.15 |

*Primary Examiner*—Robert J. Oberleitner
*Assistant Examiner*—Josie A. Ballato
*Attorney, Agent, or Firm*—Kenyon & Kenyon

[57] ABSTRACT

A vibration absorber includes an absorber mass and at least one spring element formed of an elastomer material. The absorber mass is arranged for movement on the spring element and is movable with a phase displacement relative to vibrations introduced due to operating conditions. The spring element is fixed on a vibration generator. A supplementary spring is assigned to the spring element and acts in parallel therewith to compensate for temperature effects. The supplementary spring has a spring stiffness. An aid is provided for changing the spring stiffness of the supplementary spring.

13 Claims, 2 Drawing Sheets

SPRING SYSTEM WITH ELASTOMERIC AND TEMPERATURE RESPONSIVE SPRINGS IN PARALLEL

BACKGROUND OF THE INVENTION

The invention relates generally to vibration absorbers, and more specifically to a vibration absorber which has an absorber mass arranged to move on at least one spring element made of elastomer material.

In vibration absorbers of this type, the absorber mass can be put into motion with a phase displacement relative to vibrations introduced due to operating conditions. Additionally, the spring element is fixed in place on a part which generates the vibrations. Such vibration absorbers are known in which the absorber mass and the spring stiffness of the spring element are adjusted to the frequency of the vibration to be absorbed in each instance. However, it must be noted in this connection that the spring stiffness of the elastomer spring element changes as a function of temperature. Accordingly, the inherent frequency of the vibration absorber shifts into ranges in which vibration absorption is either not required or is undesirable and hence, in either case, the result is not very satisfactory.

The present invention is directed to a vibration absorber in which temperature variations of the spring element do not have any influence on its inherent frequency.

SUMMARY OF THE INVENTION

The present invention provides a vibration absorber that includes an absorber mass and at least one spring element formed of an elastomer material. The absorber mass is arranged for movement on the spring element and is movable with a phase displacement relative to vibrations introduced due to operating conditions. The spring element is fixed on a vibration generator. A supplementary spring is assigned to the spring element and acts in parallel therewith to compensate for temperature effects. The supplementary spring has a spring stiffness. An aid is provided for changing the spring stiffness of the supplementary spring.

According to one aspect of the present invention the vibration absorber has a supplementary spring assigned to the spring element in a parallel arrangement to compensate for the effects of temperature, the spring stiffness of which can be varied by means of an aid. By providing such a structure, the inherent frequencies of systems that are capable of vibration, which have springs formed from elastomer materials, are independent of temperature. A vibration absorber structured in such a manner is particularly useful if the frequency to be absorbed lies within a narrow frequency band. Because the inherent frequency of the vibration absorber should always remain within this narrow frequency band, vibrations which occur within this range can be equalized independently of the temperature of the spring element. Depending on the spring element's temperature, the absorber mass is suspended on the spring element or the supplementary spring that is in parallel therewith or, at higher temperature ranges, the mass is suspended exclusively on the spring element. The ranges between the highest possible temperature of the spring element and the lower possible temperature of the spring element can be taken into consideration by adjusting the spring stiffness of the supplementary spring, which may be adjustable in a step-free manner.

According to another aspect of the invention, the spring stiffness of the supplementary spring increases with increasing temperature. This structure ensures that a decrease in the spring stiffness of the spring element due to increasing temperature can be compensated for by increasing the spring stiffness of the supplementary spring.

According to yet another aspect of the invention, the supplementary spring may be formed from a rubber-elastic material and the aid may be formed from an essentially tubular-shaped sleeve which can be moved in a direction perpendicular to the direction of the vibrations which are introduced. If necessary, the sleeve can be moved over the supplementary spring by a drive.

The vibration absorber functions as described below. If the component that generates the vibrations is at rest, the absorber mass places static stress on both the spring element and the supplementary spring. The supplementary spring has its least possible spring stiffness; the tubular-shaped sleeve does not cover the supplementary spring. When vibrations due to operation of the system occur, with the absorber mass preferably moving in counter-phase thereto, the spring element gradually warms up over the period of use due to internal friction. This increase in temperature would result in a reduced spring stiffness and a shift in the frequencies to be absorbed in the direction of lower frequency vibrations, if the spring stiffness of the supplementary spring were not increased. According to the present invention, the tubular-shaped sleeve is moved perpendicular to the direction of the vibrations being introduced as the spring element increasingly heats up, thus reducing its effective length. A shorter effective length results in an increased spring stiffness, which is increased to a value such that the reduced spring stiffness of the spring element due to temperature is balanced out. The inherent frequency of the vibration absorber remains essentially the unchanged, since it is independent of the temperature of the spring element.

At the maximum-occurring temperature of the spring element, the sleeve can completely cover the supplementary spring, if necessary, and uncouple it from the spring element, so that the desired inherent frequency of the vibration absorber is maintained.

The drive of the sleeve may be formed from an expansion material element that acts against a return spring. The expansion material element increases in volume upon being heated and decreases in volume upon being cooled. Depending on the particular expansion material used, different degrees of expansion occur during heating to move the sleeve over the supplementary spring. The expansion material is arranged in such a way that it is surrounded by a resilient, rubber-elastic wall on the side facing toward the sleeve, which follows the volume increase of the expansion material with increasing temperature. The expansion of the expansion material results in a displacement of the sleeve in the direction of the supplementary spring. The displacement of the sleeve may advantageously take place against the spring force of a reset spring, which is supported on a component of a statically resting housing part, on the one hand, and on the movable sleeve, on the other hand. With decreasing temperature and a reduction in volume of the expansion material, the return spring causes the sleeve to move back in the direction of its initial position and causes constant contact of the sleeve on the rubber-elastic, resilient wall.

According to another aspect of the invention, the drive of the sleeve may be formed by an electrically activated setting motor, which is electrically coupled to a control unit such that signals can be transmitted therebetween. The control unit may be an engine control for a motor vehicle. The setting motor also may be electrically coupled to a temperature sensor, which determines the temperature of the spring element. Characteristic quantities for controlling the setting motor can be stored in the engine control, for example.

The drive of the sleeve spring may be formed of a bimetallic spring. In this connection, it is advantageous from the point of view of economics that the entire vibration absorber be produced in a particularly cost-effective manner. This makes it possible for the vibration absorber to be used in areas in which the achievement of the greatest possible economic efficiency is very important.

To improve the operational characteristics over a long useful lifetime, the sleeve can be provided with a friction-reducing surface coating at least on its inner side facing towards the supplementary spring. In addition to precise control of the sleeve with lower activation forces from the drive, this structure can reliably prevent damage to the elastomer supplementary spring. The sleeve may also be formed from a self-lubricating plastic such as PTFE.

DETAILED DESCRIPTION

Figure 1:
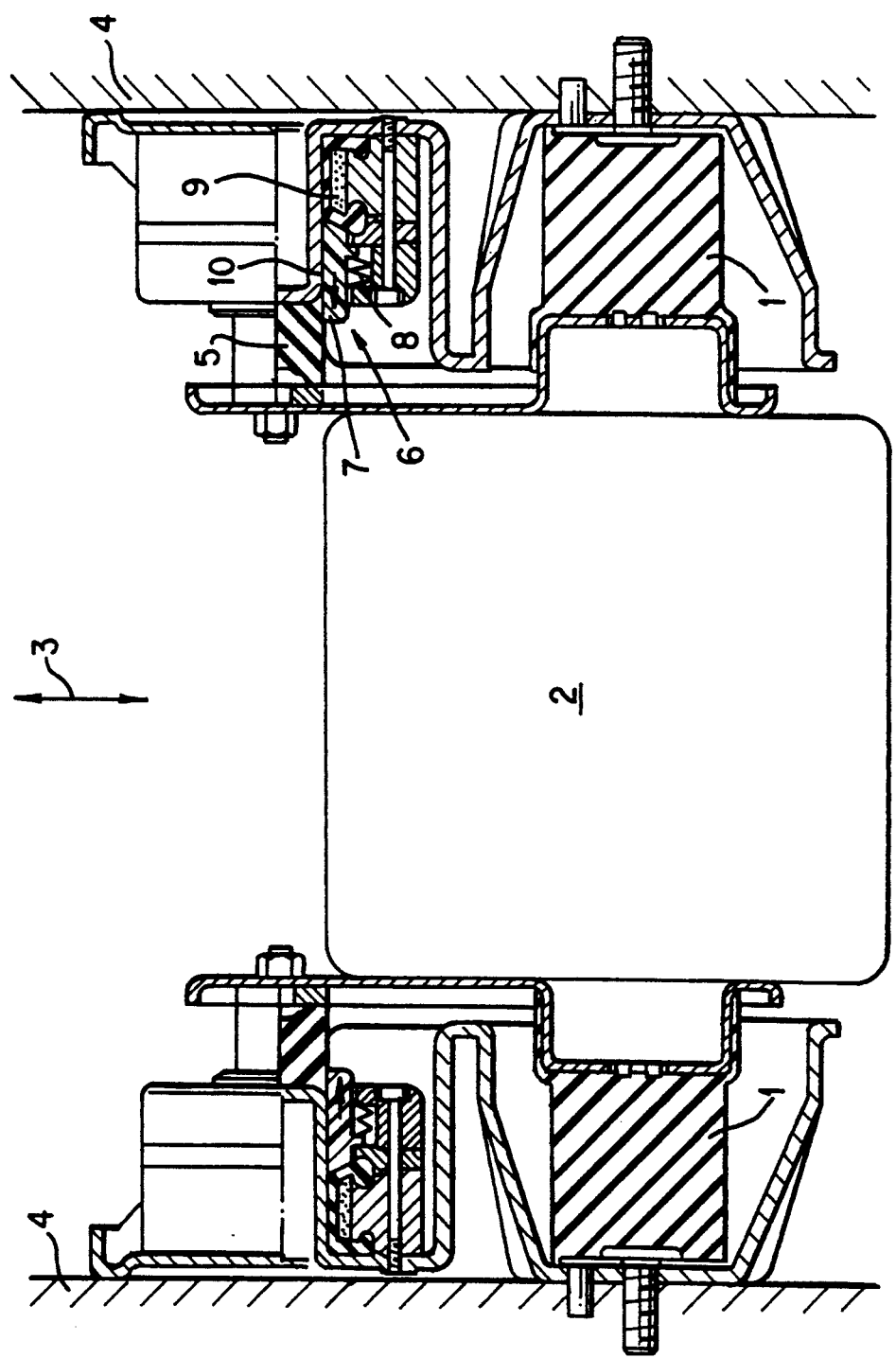
FIG. 1 illustrates the vibration absorber constructed according to the principles of the present invention when installed.

FIG. 1 illustrates a cross-sectional view of one embodiment of the vibration absorber of the present invention. The vibration absorber includes two spring elements 1 formed of elastomer material, at which an absorber mass 2 is arranged, which can be put into motion with phase displacement relative to vibrations 3 introduced due to operating conditions. The part 4, which generates the vibrations, and which is only schematically indicated in this example, may be an internal combustion engine or the wheel suspension of a motor vehicle, for example. A supplementary spring 5 is assigned to the spring elements 1 in a parallel arrangement. The spring 5 compensates for temperature influences by increasing the spring stiffness as the spring elements 1 heat up. In this first embodiment, the effective length of the supplementary spring 5 is reduced by a sleeve 7, which may be formed of a plastic such as PTFE, which is rigid along the direction of vibration. The spring 5 is pushed over the sleeve to increase the spring stiffness as required.

To keep the inherent frequency of the vibration absorber constant even when there are temperature changes within the first spring elements 1, the aid can be moved over the supplementary spring 5 perpendicular to the direction of the vibrations 3 which are introduced. As the temperature of the first spring elements 1 increases, the sleeve 7 increasingly moves over the supplementary spring 5, until the latter is almost completely covered by the sleeve at a maximum-occurring temperature. Since the drive of the sleeve shown here is formed of an expansion material element 9, which transfers only pressure forces to the sleeve disclosed in this embodiment, it is necessary to move the sleeve 7 back in the direction of its initial position when the temperature decreases and the volume of the expansion material element 9 is reduced. The use of an expansion material element 9 as the drive for an aid 6, which in the example shown here is in the form of a sleeve, provides a simple means for compensating for temperature influences on the spring elements 1.

Other types of drives for the sleeve can be formed, for example, from electrically activated setting motors, bimetallic springs or hydraulic setting devices, which essentially require the same structure as in the embodiment of the invention disclosed above.

The displacement of the sleeve 7 may advantageously take place against the spring force of a reset spring 8, which is supported on a component of a statically resting housing part, on the one hand, and on the moveable sleeve 7, on the other hand. With decreasing temperature and a reduction in volume of the expansion material, the return spring 8 causes the sleeve 7 to move back in the direction of its initial position and causes constant contact of the sleeve 7 on the rubber-elastic, resilient wall. To improve the operational characteristics over a long useful lifetime, the sleeve 7 can be provided with a friction-reducing surface coating 10 at least on its inner side facing towards the supplementary spring 5.

Figure 2:
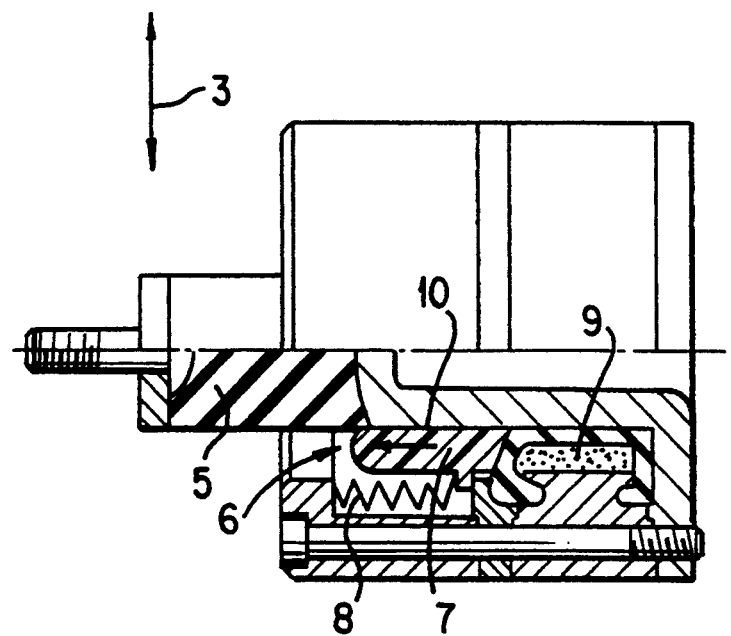
FIG. 2 illustrates a detail of a portion of FIG. 1 in which the supplementary spring is shown with its effective length at a maximum.
Figure 3:
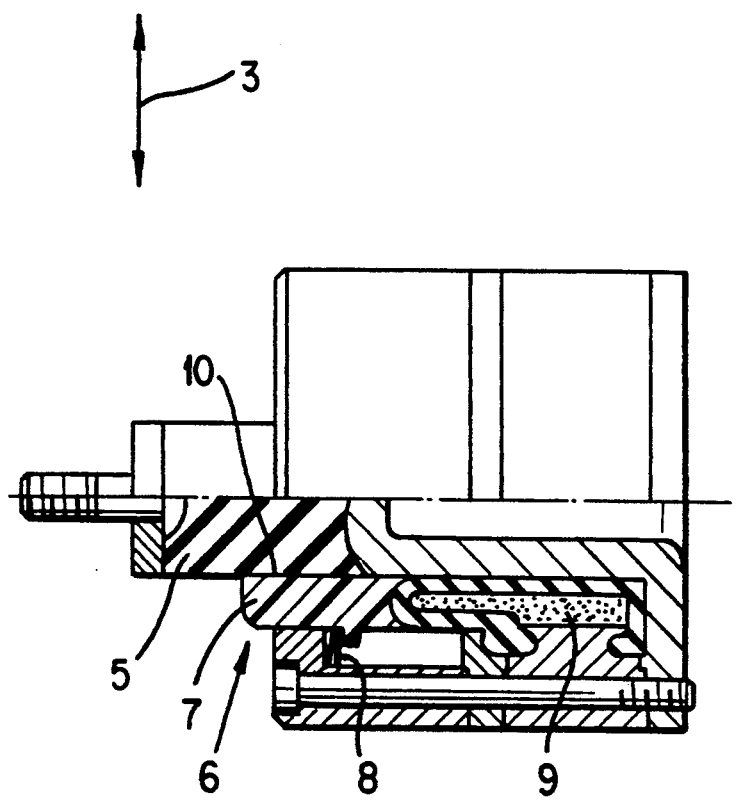
FIG. 3 illustrates the supplementary spring partly covered by the sleeve.

FIGS. 2 and 3 show the supplementary spring 5 and the activation device of the sleeve 7. In FIG. 2, the sleeve 7 does not cover the supplementary spring 5. When in use as intended, the spring 5 acts with its full effective length, which is parallel to the spring element 1 shown in FIG. 1.

With increasing temperature, the expansion material element 9 expands, as shown in FIG. 3, in such a way that the sleeve 7 moves over the supplementary spring 5 and restricts its mobility in the vibration direction 3. In the examples of the invention shown in FIGS. 1 and 3, a part of the length of the supplementary spring 5 remains active in every operating condition. If the sleeve 5 is lengthened in the direction of movement, and if the movement stroke is increased, it is possible to completely cover the supplementary spring 5, if necessary.

What is claimed is:

1. A vibration absorber comprising: an absorber mass and at least one spring element formed of an elastomer material, said absorber mass being arranged for movement on said at least one spring element, said absorber mass being movable with a phase displacement relative to vibrations introduced due to operating conditions, said at least one spring element being fixed on a vibration generator; a supplementary spring assigned to said at least one spring element and acting in parallel therewith to compensate for temperature effects, said supplementary spring having a spring stiffness; and, means for changing the spring stiffness of the supplementary spring.

2. The vibration absorber of claim 1 wherein the spring stiffness of the supplementary spring increases with increasing temperature.

3. The vibration absorber of claim 2 wherein said supplementary spring comprises a rubber-elastic material and said changing means comprises a substantially tubular-shaped sleeve that is moveable in a direction perpendicular to the direction of said vibrations which are introduced, and further comprising a drive for positioning said sleeve over the supplementary spring.

4. The vibration absorber of claim 1 wherein said supplementary spring comprises a rubber-elastic material and said changing means comprises a substantially tubular-shaped sleeve that is movable in a direction perpendicular to the direction of said vibrations which are introduced, and further comprising a drive for positioning said sleeve over the supplementary spring.

5. The vibration absorber of claim 4 wherein said sleeve is adapted to completely cover the supplementary spring and to uncouple the supplementary spring from the spring element.

6. The vibration absorber of claim 5, wherein said drive of said sleeve is formed from an expansion material element acting against a return spring, said expansion material element having a volume that expands upon heating and that decreases upon cooling.

7. The vibration absorber of claim 6, wherein said sleeve has a friction-reducing surface coating disposed on at least an inner side surface facing the supplementary spring.

8. The vibration absorber of claim 5, wherein said sleeve has a friction-reducing surface coating disposed on at least an inner side surface facing the supplementary spring.

9. The vibration absorber of claim 5, wherein said sleeve is formed from plastic.

10. The vibration absorber of claim 4, wherein said drive of said sleeve is formed from an expansion material element acting against a return spring, said expansion material element having a volume that expands upon heating and that decreases upon cooling.

11. The vibration absorber of claim 4, wherein said sleeve has a friction-reducing surface coating disposed on at least an inner side surface facing the supplementary spring.

12. The vibration absorber of claim 11, wherein said sleeve is formed from plastic.

13. The vibration absorber of claim 4, wherein said sleeve is formed from plastic.

* * * * *